Feb. 27, 1968  W. W. WILLIAMS  3,370,812
ACCELERATION LOAD CONTROL MECHANISM
Filed July 18, 1966
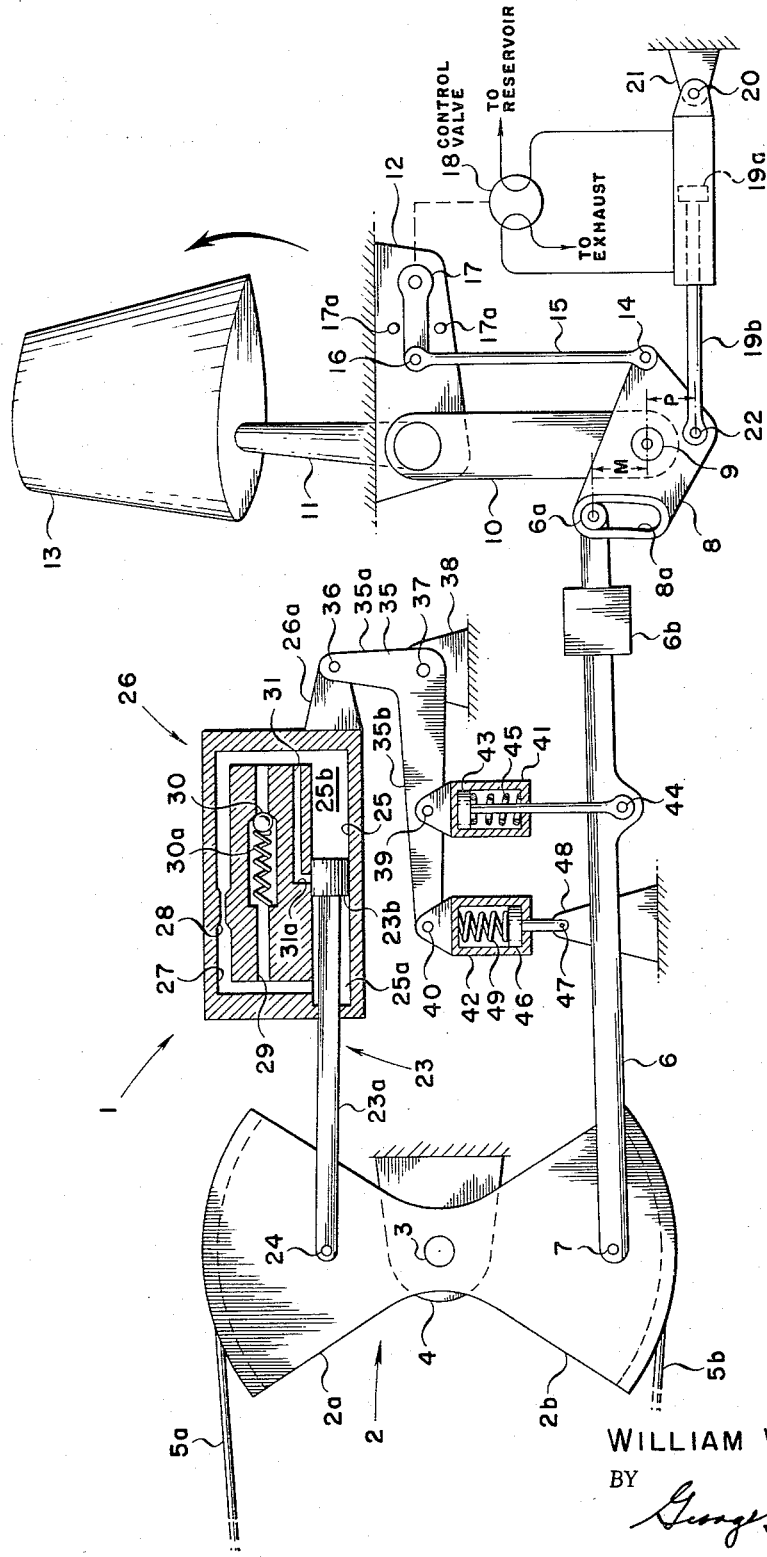
INVENTOR.
WILLIAM W. WILLIAMS
BY
Agent United States Patent Office 3,370,812
Patented Feb. 27, 1968

3,370,812
ACCELERATION LOAD CONTROL MECHANISM
William W. Williams, Atlanta, Ga., assignor to Lockheed Aircraft Corporation, Burbank, Calif.
Filed July 18, 1966, Ser. No. 566,046
6 Claims. (Cl. 244—85)

This invention relates to acceleration load control mechanisms for aircraft and more particularly to such a mechanism by which the acceleration load imposed on an aircraft during flight is adjusted by varying the pilot's mechanical advantage in moving the external control surfaces as a function of the control motion input rate and magnitude as well as the angular acceleration rate of the aircraft to the end that the pilot will at all times be able to apply maximum deflection of the surfaces commensurate with the structural integrity of the aircraft.

Power actuators have been heretofore incorporated in aircraft as boosters to assist the pilot in positioning the external control surfaces. As a result the pilot has a reduced ability to sense that he is overstressing the aircraft when he pulls out of a dive, for example, at a high rate of speed. Consequently it is within the power of the pilot to unknowingly overstress the aircraft if he rotates the elevator upwardly in an amount and/or at a rate such that the aircraft will experience an angular acceleration rate in excess of a permissible safe level.

In order to avoid this, various schemes have been devised which provide artificial sensing mechanisms to indicate to the pilot when he is overstressing the aircraft. These prior systems, however, are complex and expensive and the present invention proposes to eliminate these as well as other disadvantages and limitations of such prior art devices. To this end, a relatively inexpensive mechanical device is herein provided for indicating to the pilot that he is operating the control surface from neutral at too great a rate by varying the pilot's mechanical advantage under such conditions. Moreover, this mechanical advantage is varied as a function of control input motion rate and magnitude and/or angular acceleration rate of the aircraft.

Generally stated, the instant invention comprises an acceleration load control mechanism wherein the pilot's mechanical advantage in moving the external control surface from neutral is initially varied as a function of control input motion rate and magnitude to permit the pilot to readily sense that his change in direction command is too abrupt. Also, the mechanism incorporates apparatus for varying the pilot's mechanical advantage as a function of the angular acceleration of the aircraft so that pilot can sense by the control force required that his angular acceleration is approaching a critical value for safety.

At the same time in order to permit rapid recovery of the aircraft from an unsafe condition, provisions are made for facilitating a rapid movement of the external control surface from a deflected position to the neutral position. However, since there is little danger of overloading the aircraft while the control surface is in the neutral position, the mechanism permits substantially unrestricted movement of the elevator at this time.

With the above and other objects in view as will be apparent, this invention consists in the construction, combination, and arrangement of parts all as hereinafter more fully described, claimed and illustrated in the accompanying drawing wherein is shown a general, schematic view of an acceleration load control mechanism in accordance with the teachings hereof as applied to the external movable control surface, e.g. the horizontal tail surface or elevator, of an aircraft.

More particularly, the drawing shows an elevator control system 1 comprising an elevator control quadrant 2 pivotally mounted by a pin 3 on a bracket 4 and having elevator control cables 5a and 5b connected to the periphery of its top and bottom sectors 2a and 2b respectively. The elevator control cables 5a and 5b are connected at their other ends (not shown) to the pilot's control lever so that movement thereof in one direction will impart a clockwise rotation to the quadrant 2 while movement thereof in the opposite direction will impart a counterclockwise rotation to the quadrant 2.

A control rod 6 having a roller 6a secured to one of its ends and a mass or weight 6b adjacent thereto is connected at its other end by a pin 7 to the quadrant sector 2b. The roller 6a is mounted in an arcuate slot 8a of a booster feel lever 8 which is pivotally connected medially of its length by a pin 9 to a lever 10. The control rod 6 pivots about the pin 7 to move the roller 6a within the slot 8a which is arcuate about the pin 7 so that such loads in the control rod 6 act through the roller 6a at approximately right angles to the contact point of the roller 6a and slot 8a. The lever or elevator horn 10 is fixedly connected to a torque tube 11 which is mounted at one end in a bracket 12 secured to associated aircraft structure. In turn, the torque tube 11 is connected to an elevator 13 for effecting rotation thereof.

A pin 14 connects one end of a link 15 to the end of the booster feel lever 8 remote from slot 8a and in opposition thereto with respect to the pin 9. A pin 16 connects the other end of the link 15 to a booster valve crank 17 which is mounted on the bracket 12. The booster valve crank 17 is connected to a reversible control valve 18 of a booster or actuator such as a reversible hydraulic cylinder 19a connected by a pin 20 to a fixed support bracket 21. A piston rod 19b extending from the cylinder 19a is connected at its outer end as at 22 to the booster feel lever 8.

The booster valve crank 17 is positionable through predetermined distances from a neutral position between forward and reverse to positions defined by positive stops 17a. The control valve is thereby actuated for selective connection of the opposite sides of the piston/cylinder assembly 19a/19b to hydraulic fluid supply and reservoir respectively in conventional manner for rotation of the elevator 13 accordingly in either direction.

A piston assembly 23 including a piston rod 23a and a piston 23b is connected by a pin 24 to the top section 2a. The piston 23b is mounted for reciprocation within a bore 25 in a cylinder 26 and divides the cylinder bore into chambers 25a and 25b. Chambers 25a and 25b are interconnected at their opposite ends by a conduit 27 having a restriction 28 therein. A by pass line 29 having a check valve 30 which is biased to a closed position by a spring 30a interconnects opposite ends of the conduit 27. The check valve 30 is spring-biased in a direction to permit fluid flow from the chamber 25b to the chamber 25a through the line 29 when the force of the spring 30a is overcome, and to prevent reverse flow from the chamber 25a to the chamber 25b through the line 29. A conduit or line 31 is also provided to connect the end of the chamber 25b to cylinder bore 25 through a port 31a intermediate chambers 25a and 25b. When the quadrant 2 is in the neutral position as shown, the piston 23b overlies and covers the port 13a.

The cylinder 26 terminates at its other end in an ear 26a through which it is pivotally connected to one arm 35a of the bellcrank 35 by a pin 36. The bellcrank 35 is pivotally connected medially by a pin 37 to a fixed support bracket 38. The other arm 35b of the bellcrank 35 is pivotally connected by pins 39 and 40 to cylinders 41 and 42 respectively which together with their associated pistons and springs may properly be called spring cartridges. Cylinder 41 is filled with a viscous damping fluid and has a piston assembly 43 mounted therein which is pivotally connected by a pin 44 to the control rod 6 medially of its length. A compression spring 45 is mounted within the cylinder 41 so as to normally contract the piston assembly 43 in the cylinder 41 and maintain the control rod roller 6a biased into engagement with the top end of slot 8a. Upon movement of the cylinder 26 to the left and counterclockwise rotation of bellcrank 35, the cylinder/piston assembly 41/43 moves the roller 6a of control rod 6 to the lower end of the slot 8a.

The cylinder 42 has a piston assembly 46 mounted therein, the outer end of the piston rod of which is pivotally connected by a pin 47 to a stationary support bracket 48. Also, a spring 49 is mounted in the cylinder 42 which reacts between the head of the piston assembly 46 and the cylinder 42 to normally maintain the cylinder 26 in the position shown with the piston 23b covering the port 31a. Normal interaction of the cylinder 42 and piston 46 prevents movement of the cylinder 26 to the right and clockwise rotation of the bellcrank 35 from their position shown in the drawing.

In operation, when the aircraft is in level flight, the components of the elevator control system 1 will be in the neutral position as shown. If for example the pilot decides to climb, he pulls back on the control stick thereby rotating the quadrant 2 in the counterclockwise direction causing the piston assembly 23 to be moved to the left and the control rod 6 to be moved to the right. Upon movement of the piston assembly 23 to the left, the check valve 30 remains closed and the restriction 28 regulates the rate of flow from chamber 25a to chamber 25b. Thus the magnitude of the force tending to rotate bellcrank 35 in the counterclockwise direction is established as a function of the rate and magnitude of counterclockwise movement of the quadrant 2. The spring 49 in the cylinder 42 supplies a force tending to prevent counterclockwise movement of the bellcrank 35 which would cause downward movement of the control rod 6. It is, therefore, apparent that by an appropriate selection of the size of restriction 28 and the spring constant of spring 49 that downward movement of the control rod 6 will not be effected until a predetermined rate of magnitude of movement of the quadrant 2 is exceeded.

Assuming a rate and magnitude of the quadrant 2 movement less than this preselected value, upon counterclockwise movement of the quadrant 2, control rod 6 is moved to the right thereby applying a force to the booster feel lever 8. This force acts through a moment arm length M defined by the distance between the centerlines of the rod 6 and the pin 9 to produce a clockwise moment in the booster feel lever 8 about the pin 9. In response to this, the booster feel lever 8 rotates in the clockwise direction lowering the link 15 and causing movement of the valve 18 whereby pressure fluid is supplied to the cylinder 19a so as to cause contraction of the cylinder/piston assembly 19a/19b.

Upon contraction, the cylinder/piston assembly 19a/19b applies a force to the booster feel lever 8 which acts through a moment arm length P defined by the distance between the centerlines of the rod 19b and the pin 9 to create a counterclockwise moment in the booster feel lever 8 about the pin 9. This counterclockwise movement tends to raise link 15 upon overcoming the opposing moment in the booster feel lever 8 about the pin 9 produced by the control rod 6 force at which time the booster valve crank 17 is returned to the neutral position.

From the foregoing it is apparent that the forces applied to the booster feel lever 8 by the control rod 6 and piston assembly 19b are transmitted through pin 9 to the elevator horn 10. Moreover, these forces act together in the same direction to produce a counterclockwise moment of the horn 10 about the elevator torque tube 11 to rotate the elevator 13 as indicated by the arrow, i.e., upwardly. This counterclockwise moment is equal and opposite to the aerodynamic hinge moment of the elevator 13.

It would appear that for upward rotation of the elevator 13 the clockwise moment about the pin 9 caused by the control rod 6 force is maintained in equilibrium with the counterclockwise moment about the pin 9 caused by the piston assembly 19b force so as to maintain the valve 18 open and to effect continued retraction of the piston assembly 19b. As a practical matter, however, the power applied by the piston assembly 19b to the booster feel lever 8 is so much greater in magnitude than that applied through the control rod 6 that rotation of the elevator 13 as stated is effected by a series of incremental displacements of the booster valve crank 17 between neutral and a position effected by operation of the piston assembly 19b as described. Under these conditions, normal elevation of the elevator 13 results.

Assume now that the rate of counterclockwise rotation of the quadrant 2 is increased under an emergency condition to a value such that the rate of fluid flow through the restriction 28 is insufficient to contain the force exerted on the cylinder 26 by the piston 23 to a value less than the opposing force of spring 49. Under this condition, the cylinder 26 moves to the left rotating bellcrank 35 in the counterclockwise direction compressing the spring 49 until an equilibrium condition is achieved. This causes downward pivotal movement of the control rod 6 about the pin 7 by reaction of the cylinder 41 with piston rod 43. Such downward movement of the control rod 6 positions the roller 6a at some distance below the top of slot 8a of the booster feel lever 8 decreasing the length of the moment arm M through which the control rod 6 force acts about the pin 9 to move the booster valve crank 17 through the link 15. Since the moment arm length P through which the piston assembly 19b acts remains substantially constant, the effect of downward movement of the roller 6a in the slot 8a is to reduce the mechanical advantage of the pilot when he attempts to rapidly change the position of the elevator 13.

This reduction of the pilot's mechanical advantage requires that the pilot exert a greater force to move the elevator 13 upwardly and accordingly indicates to the pilot that his movement of the elevator is too rapid. Since the summation of moments of forces applied by the control rod 6 and the piston assembly 19b around the pin 9 is equal to zero (0), i.e. the booster feel lever 8 is at all times balanced, a reduction in the moment arm length M will appreciably increase the force required by the pilot to displace the elevator 13 upwardly.

At the same time the proportions of the force applied to the elevator 13 through the rod 6 and piston 19b are equal to the ratio between the force in each rod 6 and piston 19b when multiplied by its respective moment arm length M and P. With respect to movement of the lever 8 about the torque tube 11, however, these forces in the rod 6 and piston 19b work together as a unit to deflect the elevator accordingly.

With time, the restriction 28 bleeds fluid from the chamber 25a into chamber 25b permitting the spring 49 to restore the control rod roller 6a to the top of the slot 8a. The pilot's mechanical advantage is thereby restored. Thus, the cylinder 26 may be said to operate as a rate of motion device.

In response to the command thus effected, the aircraft will take a corresponding attitude and direction. If in the process the angular acceleration of the aircraft is low, nothing further will happen to the control mechanism. If, however, its angular acceleration is above a critical, pre-established safe level, the mass 6b by virtue of its inertia will position the roller 6a downward in the slot 8a in opposition to the counter-biasing force of the spring 45 and the viscous fluid acting in the cylinder 41 in an amount depending upon said angular acceleration rate to reduce the pilot's mechanical advantage correspondingly. The pilot can thereby sense the fact of his climbing at too great a rate by the increase in control force required to prevent the quadrant 2 from rotating in the clockwise direction.

When on the other hand the quadrant 2 is rotated in a clockwise direction, the check valve 30 opens permitting the rapid flow of pressure fluid from the chamber 25b through the line 29 as well as through the line 27. This corresponds to movement of the elevator 13 in a direction opposite the arrow. After the quadrant 2 has thus rotated through a small clockwise arc from the neutral position shown, the piston 23b clears the port 31a placing the chamber 25b in communication with the chamber 25a through lines 31, 29 and 27 permitting movement of the elevator 13 between the neutral position and the down elevator position at a substantially unrestricted rate. During the corresponding downward movement of the aircraft, the weight 6b has a tendency to remain at the top of the slot 8a thereby giving the pilot a maximum mechanical advantage during this maneuver irrespective of the angular acceleration rate of the aircraft.

If desired the control force characteristics of the mechanism may be changed by repositioning port 31a, adding a restriction in the line 31 or eliminating line 31 altogether. Also as indicated above, a change in the size of restriction 28 and/or a change in the spring characteristics of spring 30a will also permit variation of the control force characteristics of the mechanism.

While a particular embodiment of the invention has been hereinabove illustrated and described, numerous modifications will be apparant to those skilled in the art without departing from the spirit and scope of the invention. The appended claims are intended to cover all such modifications and alone define the limitations of this invention.

What is claimed is:

1. An acceleration load control mechanism for aircraft having an external control surface hinged to fixed structure of the aircraft and exposed to aerodynamic forces comprising: a horn connected to and extending from said control surface; a lever; a first pivotal connection between said lever and the outer end of said horn; a pilot's push-pull rod; a second pivotal connection between said lever and said push-pull rod, said second pivotal connection being movable relative to said first pivotal connection linearly with respect to said horn; a power actuator; a third pivotal connection between said lever and said power actuator; a control for the extension and contraction of said actuator; a fourth pivotal connection between said lever and said control, said second and fourth and said second and third pivotal connections being disposed on opposite sides of said first pivotal connection; and a drive operative on said second pivotal connection for the adjustment thereof, said drive being responsive to a pilot's input force of predetermined rate and magnitude moving said push-pull rod whereby the distance between said second and said first pivotal connections is varied while the distance between said third and said first pivotal connection remains substantially constant.

2. The mechanism of claim 1 wherein said second pivotal connection includes a slot and roller engagement operative between said lever and said push-pull rod, and said drive includes force applying means of predetermined magnitude operative on said roller to locate and maintain it at one end of said slot, and overpowering means to move said roller away from said one slot end.

3. The mechanism of claim 1 wherein said push-pull rod is connected at its end remote from said second pivotal connection to one sector of a control quadrant, and said drive is connected to the other, diametrically opposed sector of said control quadrant whereby said drive is concurrently operative with said push-pull rod.

4. The mechanism of claim 2 wherein said force applying means includes a bellcrank connected at one end for movement concurrently with said push-pull rod, restraining means of present value operative on said bellcrank to resist such movement, and a resilient member connecting the other end of said bellcrank to said push-pull rod adjacent the roller and slot end thereof.

5. The mechanism of claim 2 wherein said overpowering means includes a mass connected to said push-pull rod adjacent its roller and slot end.

6. The mechanism of claim 2 wherein the slot of said engagement is in said lever, extends in a plane generally parallel to said horn and defines an arcuate surface, and the roller of said engagement is carried by the outer end of said push-pull rod with its periphery engaging said arcuate surface, the other end of said push-pull rod being pivotally secured.

References Cited
UNITED STATES PATENTS

| | | | |
|---|---|---|---|
| 2,796,774 | 6/1957 | Peed | 244—83 XR |
| 2,849,198 | 8/1958 | Borngesser | 244—85 XR |
| 2,974,908 | 3/1961 | Platt | 244—77 |

ANDREW H. FARRELL, *Primary Examiner.*